United States Patent [19]

Sawyer

[11] 4,002,791

[45] Jan. 11, 1977

[54] BELT COATED WITH POLYURETHANE COMPOSITION CONTAINING CELLULOSIC PARTICLES

[75] Inventor: John M. Sawyer, Cuyahoga Falls, Ohio

[73] Assignee: The Goodyear Tire & Rubber Company, Akron, Ohio

[22] Filed: Feb. 17, 1976

[21] Appl. No.: 658,433

[52] U.S. Cl. .................... 428/260; 106/36; 244/110 C; 244/110 F; 244/110 R; 260/37 N; 428/262; 428/283; 428/326; 428/909

[51] Int. Cl.² .............. B32B 5/16; B32B 27/04; B32B 27/40; B64F 1/02

[58] Field of Search ......... 428/283, 326, 909, 262, 428/260; 244/110 C, 110 F, 110 R; 106/36

[56] References Cited

UNITED STATES PATENTS

| | | | |
|---|---|---|---|
| 2,313,082 | 3/1943 | MacDonald | 428/283 |
| 3,513,231 | 5/1970 | Bair et al. | 244/110 R |
| 3,549,472 | 12/1970 | King et al. | 428/283 |
| 3,597,306 | 8/1971 | Mesek et al. | 428/283 |
| 3,899,171 | 8/1975 | Haller | 428/909 |
| 3,974,320 | 8/1976 | Gerlock et al. | 428/283 |

*Primary Examiner*—J.C. Cannon
*Attorney, Agent, or Firm*—F. W. Brunner; J. D. Wolfe

[57] ABSTRACT

A woven fabric belt having a coating of polyurethane on each face and extending through the interstices of the fabric. The polyurethane is the reaction product of a polypropylene ether glycol of 4,4'-methylene di(cyclohexylene isocyanate) cured with p,p'-methylene dianiline and having at least one face of said belt covered with the polyurethane having walnut shell powder incorporated therein.

3 Claims, No Drawings

BELT COATED WITH POLYURETHANE COMPOSITION CONTAINING CELLULOSIC PARTICLES

This invention relates to a method of coating a woven fabric to obtain a uniform coating thereon to form a woven fabric belt after press curing to give a uniform thickness. More specifically, this invention relates to a method of applying a liquid polyurethane reaction mixture to a fabric to build up a coating thereon and then smoothing the coatings down to a specified thickness and uniformity of coat and the resulting product.

Heretofore fabrics have been coated utilizing cements or solvent solutions of the coating material on cement spreaders or in calendering equipment. Also, fabric has been coated by spraying on various solvent solutions of cements and allowing the solvent to evaporate. One of the disadvantages of coating fabric according to these methods is the trouble experienced with getting sufficient penetration of the cement into the interstices of the woven fabric. Another difficulty is getting a uniform coat on the fabric and especially is this difficult where the resulting coated fabric, viz. the belt, is to be utilized on a roll where the amount of fabric to be placed on a roll is limited and a few mils difference in thickness could affect the amount placed on the roll or the ability to wind and unwind the belt on the roll at high speeds.

An object of this invention is to provide a belt having a uniform thickness and hydrolysis resistant polyurethane covering.

The objects of this invention may be accomplished by applying at least one coat of a suitable fluid polyurethane reaction mixture to a woven fabric to coat fabric, allowing the reaction mixture to cure to a tack-free condition before the application of additional coats and then placing the coated fabric in essentially a tack-free condition in a press and pressing at sufficient temperature and pressure to force the coating material while in a relatively cured state into the interstices of the fabric to thereby obtain a coated fabric having a predetermined thickness and freedom from occluded gas bubbles.

The coatings may be applied to the fabric by either spraying the reactive mixture onto the fabric or it may be applied on a spreader and smoothed to a desired thickness by means of a doctor blade or roll. Once the coating has been applied to the fabric and cured sufficiently to give a coating which is essentially tack-free an additional coat may be applied in accordance with the previously indicated procedures. The coating on at least one face of the fabric must be with a reaction mixture containing ground walnut shells. Then the fabric is placed in a flat curing press or rotary curing machine under sufficient temperature and pressure to render the tack-free coating fluid or flowable and thereby force the coating into the interstices of the fabric to smooth out the thickness of the coating on the fabric to yield a belt of uniform gauge.

To more specifically illustrate this invention, a woven polyamide or polyester fabric such as that used in normal belts is coated with a polyurethane reaction mixture to give a tack-free coating of preferably 0.3 ± 0.1 inch on each face of the fabric. Preferably at least one face of the fabric is coated with a polyurethane reaction mixture containing sufficient ground walnut or nut shell powder of 40 to 60 mesh U.S. Standard Sieve to give the face a coefficient of friction greater than that yielded by polyurethane alone. The coating can be applied either by spraying or doctoring onto fabric as the fabric moves past the coating station.

After the polyurethane coating of at least 0.2 inches has been applied and is tack-free, the coated fabric is placed in a press at about 110° to 120° C. for ten minutes at 100 or more pounds per square inch (psi) pressure to force the polyurethane to penetrate the interstices of the woven fabric to give a belt of uniform gauge and a smooth surface.

To specifically illustrate an embodiment of this invention a nylon woven belt fabric was placed on a flat surface and given a spray coat of a polyurethane reaction mixture and allowed to be exposed to the air until the polyurethane reaction mixture had substantially cured to give a tack-free surface. Then an additional coat of polyurethane was applied to build the coating on the fabric to a thickness of about one-sixteenth to a quarter of an inch, then the fabric containing the polyurethane coating was turned over to expose the other side of the fabric and it was likewise given two coats of the polyurethane reaction mixture. When the coatings on the fabric had cured for 10 to 100 hours the fabric was placed in a flat press and pressed at 300 pounds per square inch for 6 to 15 minutes at 130° C. Then the fabric was removed from the press and tested. The test indicated that the cloth covered belt was substantially the same thickness with no variation from one end to the other. Also, on examination it was observed that the polyurethane after the press treatment had penetrated throughout the fabric interstices and there were no air bubbles. Furthermore, the pressure treatment improved the physical properties of the belt. This belt was placed on test and found suitable for use as the belting in an aircraft arresting gear unit.

The polyurethane reaction mixture utilized was a 100 parts of a prepolymer of a mixture of a mol of polypropylene ether glycol of about 2000 molecular weight and two mols of a polypropylene ether glycol of 1000 molecular weight with six mols of 4,4'-methylene di(-cyclohexylene isocyanate) which had been reacted to give a free NCO content of 4.2 to 4.6 percent by weight and 35.41 parts of a curative made by mixing 226.2 parts of p,p'-methylene dianiline, 24.04 parts of a resinous surface tension or leveling agent available as "Modaflow" from Monsanto Chemical Company and 601 parts of Cellosolve acetate.

The coating on at least one face of the fabric is coated with the above polyurethane reaction mixture which contains 13.94 parts of walnut shell powder per 100 parts of prepolymer to give that face of the belt a greater coefficient of friction and thus control the backlash of the belt as it is wound and unwound on rolls at very high speeds and loads. Belts made as above and cured at room temperature for several days had excellent hydrolysis resistance. The speed of the reaction may be varied by utilization of various catalysts such as tertiary amines or the metal catalysts such as tin octoate.

Any of the well-known fabrics useful in making belts may be utilized and especially desirable are those fabrics made from glass, cellulose, the polyamides such as nylon, and the modified cellulose.

While certain representative embodiments and details have been shown for the purpose of illustrating the invention, it will be apparent to those skilled in this art that various changes and modifications may be made therein without departing from the spirit or scope of the invention.

What is claimed is:

1. A woven fabric belt having a coating of polyurethane on each face and extending through interstices of the fabric, the polyurethane comprising the reaction product of a polypropylene ether glycol, 4,4'-methylene di(cyclohexylene isocyanate) cured with p,p'-methylene dianiline and at least one face of said belt contains said polyurethane having walnut shell powder incorporated therein.

2. The woven fabric belt of claim 1 wherein the shell powder is 5 to 15 percent by weight of the polyurethane.

3. The woven fabric belt of claim 1 wherein the polyurethane comprises the reaction product of a mol of a polypropylene ether glycol with 1.5 to 2.5 mols of 4,4'-methylene di(cyclohexylene isocyanate) with sufficient p,p'-methylene dianiline to be equivalent to 87 to 98 percent free NCO content relative to the glycol.

* * * * *